UNITED STATES PATENT OFFICE.

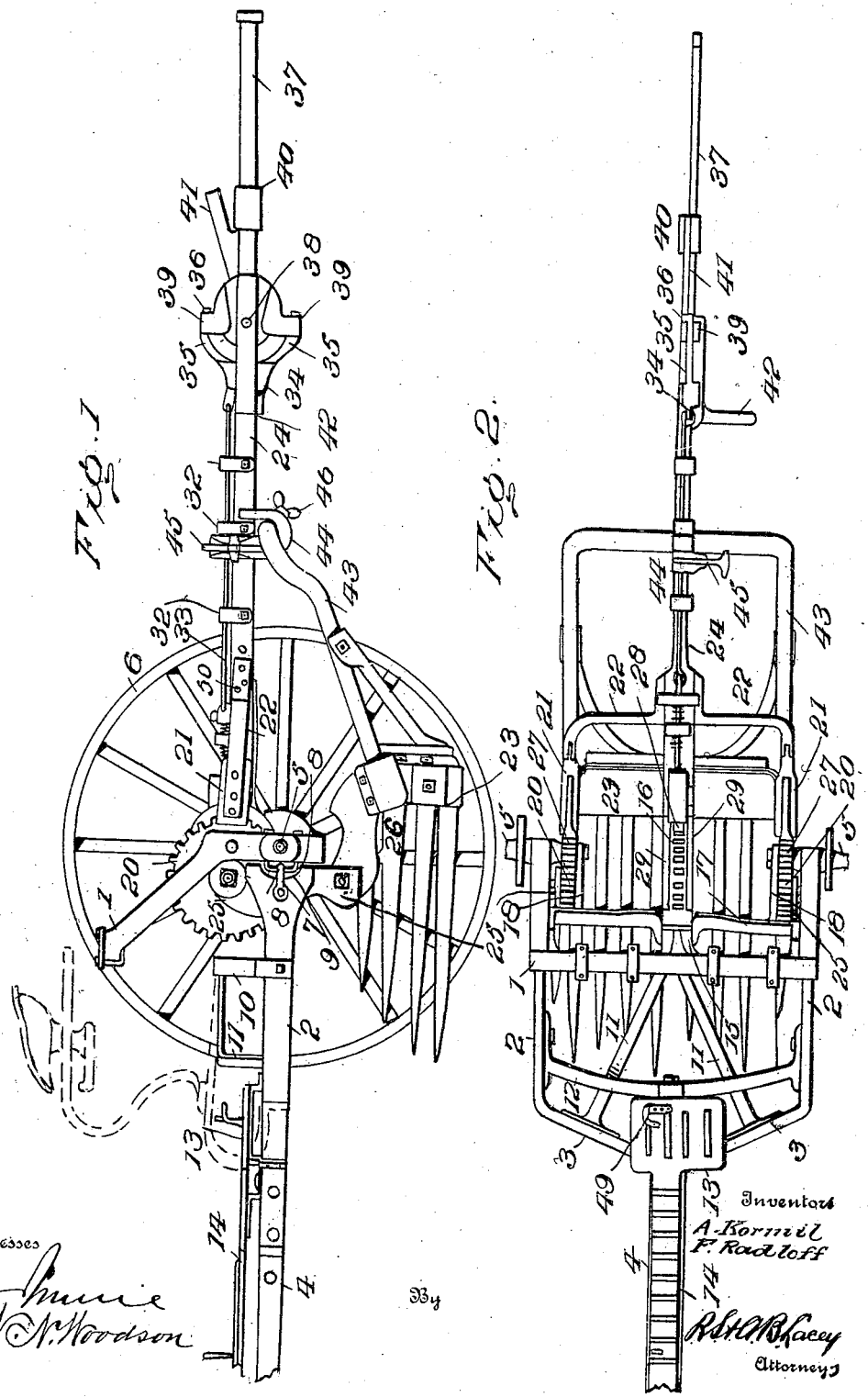

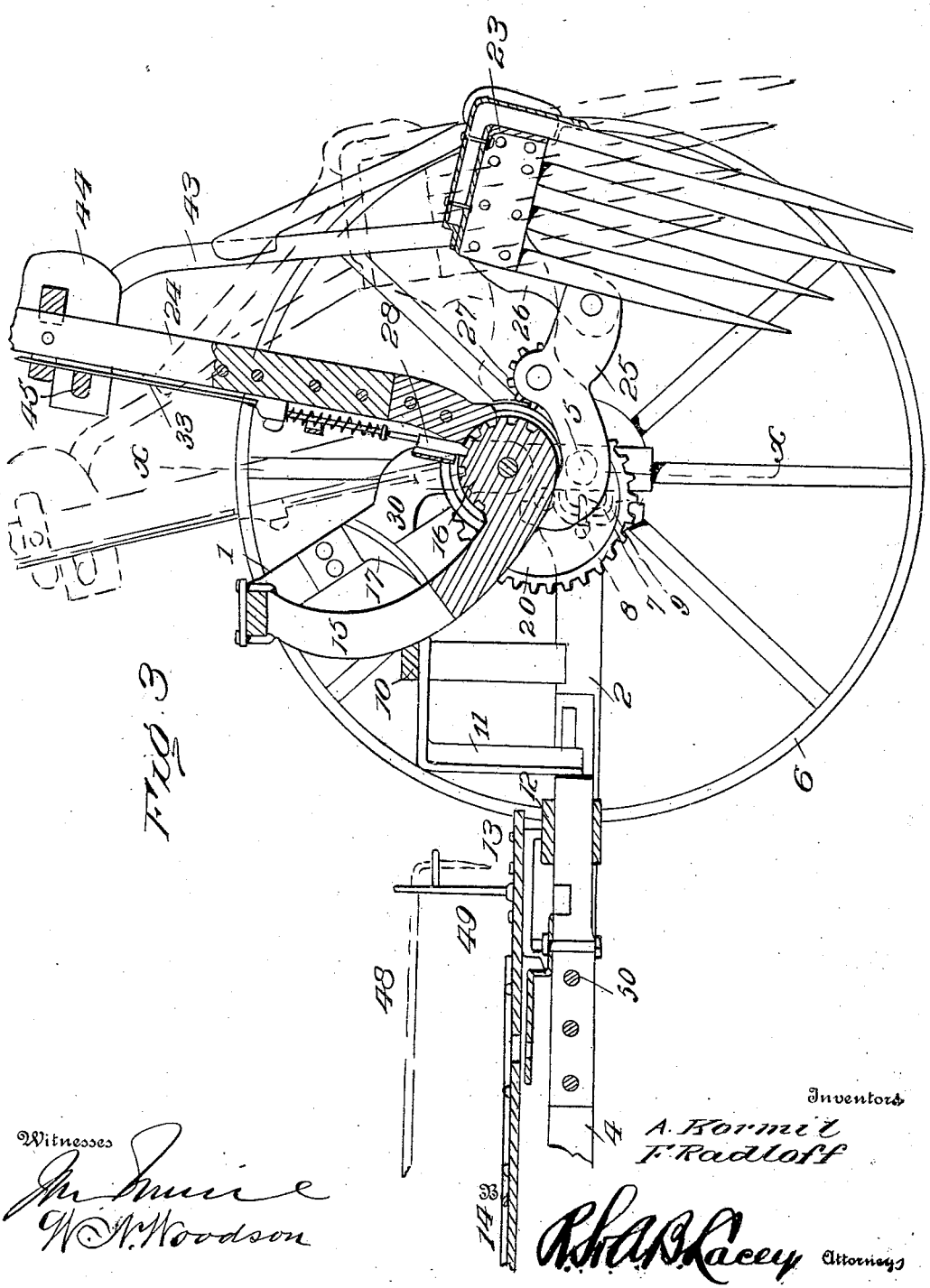

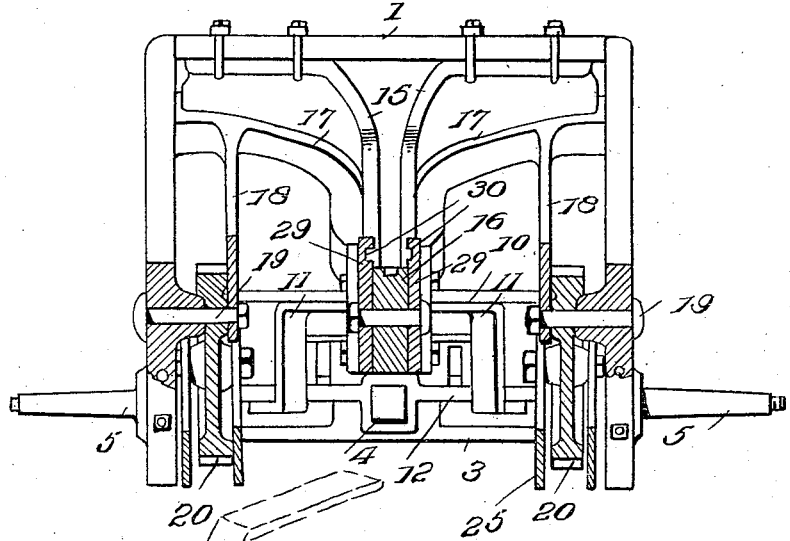
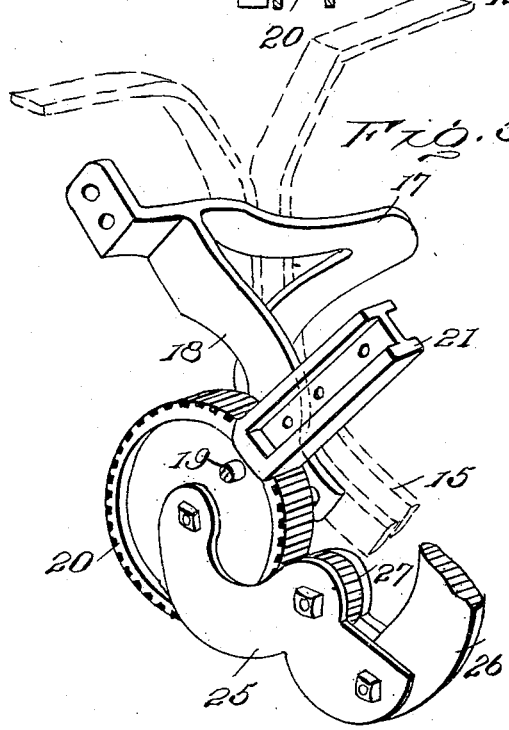
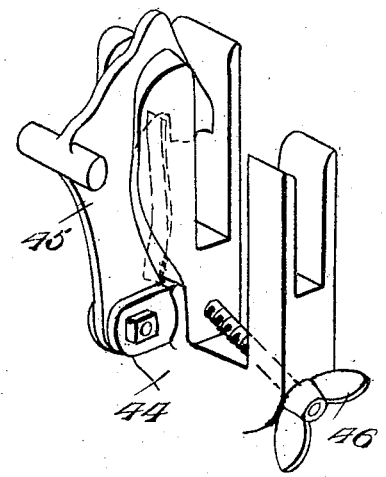

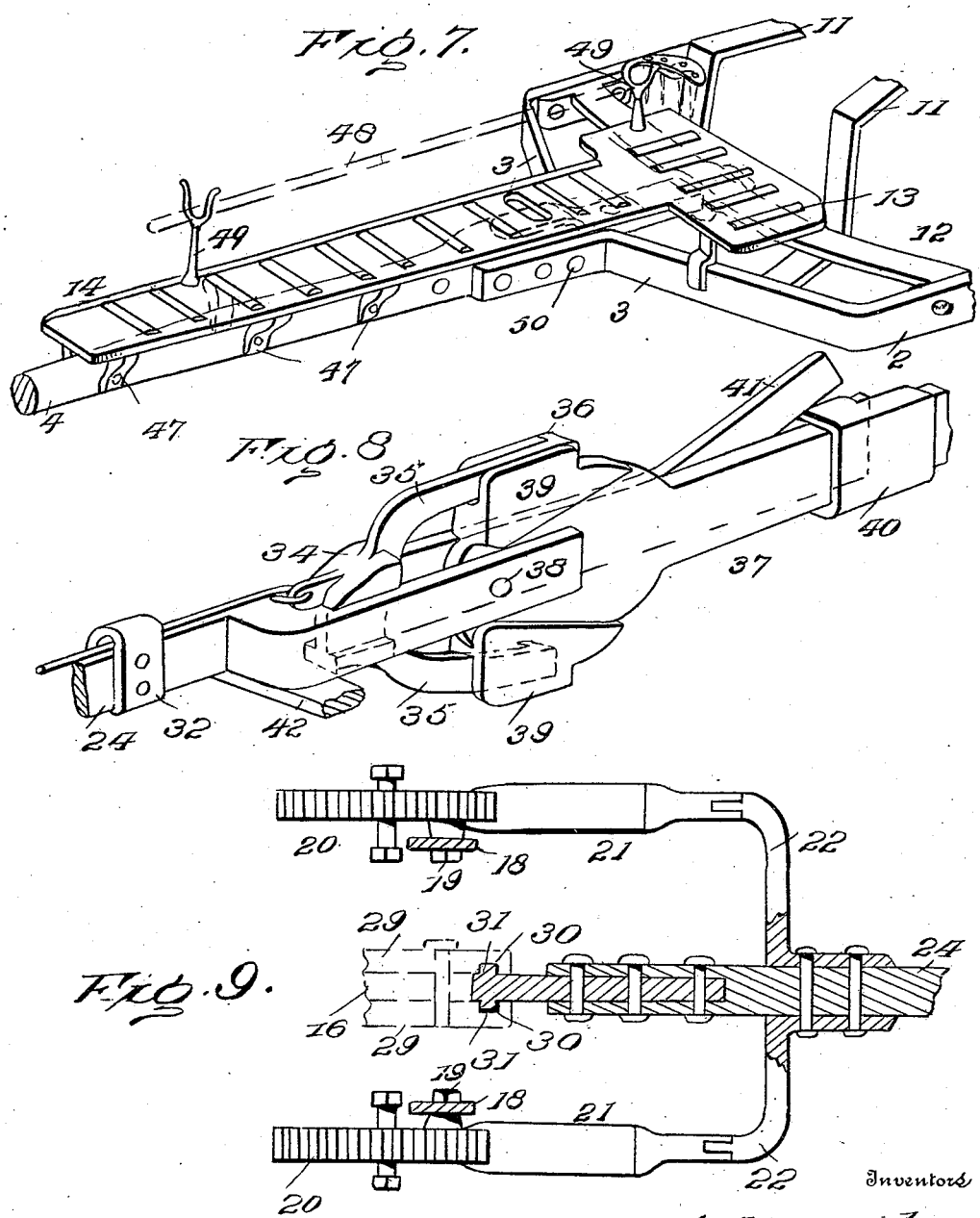

ALEXANDER KORMIL AND FREDRICK RADLOFF, OF GOLDENDALE, WASHINGTON.

WHEEL-FORK.

No. 880,543.  Specification of Letters Patent.  Patented March 3, 1908.

Application filed August 30, 1905. Serial No. 276,445.

*To all whom it may concern:*

Be it known that we, ALEXANDER KORMIL and FREDRICK RADLOFF, citizens of the United States, residing at Goldendale, in the county of Klickitat and State of Washington, have invented certain new and useful Improvements in Wheel-Forks, of which the following is a specification.

This invention relates to a scraper or fork embodying a supporting frame, a scoop and connections and operating means for the scoop.

The present invention contemplates, in a machine of the class aforesaid, novel instrumentalities including mountings, actuating means, connections and like parts for the operating elements and improvements in the general structure, whereby a wide range of adjustment is provided for and the machine made more subservient to the will of the operator.

For a full description of the invention and the merits thereof and also to acquire a knowledge of the details of construction of the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side elevation of a machine embodying the invention, the wheel on the near side being omitted. Fig. 2 is a top plan view of the machine, parts being broken away. Fig. 3 is a vertical central longitudinal section of the machine showing the parts on a larger scale and illustrating two positions of the fork or scoop by full and dotted lines. Fig. 4 is a transverse section on the line *x—x* of Fig. 3. Fig. 5 is a detail perspective view of a hanger for one side of the fork or scoop and the parts intimately associated therewith. Fig. 6 is a detail perspective view of the clamp for securing the bail of the fork or scoop to the operating lever.
Fig. 7 is a detail perspective view of the inner end of the pole or tongue, the running board and the front portion of the main frame. Fig. 8 is a detail perspective view of the outer end portion of the operating lever and the hand piece coöperating therewith. Fig. 9 is a detail view of the arch, the inner end portion of the operating lever and the parts directly coöperating therewith.

Corresponding and like parts are referred to in the following description and indicated in all the views of the drawings by the same reference characters.

The main frame comprises arch 1 and side bars 2, the latter being inwardly deflected at their front ends, as shown at 3, and secured to opposite sides of the pole or tongue 4. The arch 1 has its side members rearwardly and downwardly inclined and provided with spindles 5 upon which the ground wheels 6 are loosely mounted. The side bars 2, with their forward bent ends 3, constitute a draft frame which normally occupies an approximately horizontal position and which is attached to the arch 1 in any substantial manner. It is preferred to have a limited play between the draft frame and arch and to effect this result a clevis 7, secured to the rear ends of the side bars 2, engages with the vertical bars of staples 8 attached to the lower ends of the side bars of the arch 1. The rear ends of the side bars 2 are vertically widened to obtain an extended bearing against the lower ends of the side bars of the arch, thereby preventing relative turning of said arch and draft frame. The clevis 7 occupies a medial position and the rear edges of the widened extremities of the bars 2 are indented, as indicated at 9, so as to clear the projecting ends of the staples 8 and admit of the draft frame having a relative vertical play. An arched bar 10 connects the side bars 2 and forwardly diverged braces 11 connected at a central point with the inwardly bent ends 3 of the side bars 2, resulting in the provision of a substantial structure. A transverse bar 12 is attached at its ends to the side bars 2 and intermediate of its ends to the braces 11 and serve to strengthen the draft frame, to receive the inner end of the pole or tongue 4, and to support the platform 13 which forms a part of the running board 14 extending over the pole or tongue.

An arm 15 is secured to the horizontal portion of the arch 1 and curves rearwardly and downwardly and terminates in a head 16 of approximately circular form. The arm 15 is of bracket formation and for convenience, lightness and strength of construction its upper portion is bifurcated and extended laterally and clipped or otherwise fastened to the horizontal portion of the arch. Braces 17 connect the arm 15 with the side members of the arch 1. Hangers 18 are pendent from the upper, outer ends of the braces 17 and extend approximately parallel with the side members of the arch 1. The lower ends of the hangers 18 are connected to the side members of the arch 1 by pins 19 upon which are loosely mounted disks 20, each of said disks being formed with a stem 21 to which the lower ends of members 22 are attached. Obviously, within the purview of the invention, said members 22 may be formed with the disks 20 or attached thereto in any manner so as to move therewith as one part. The members 22 are connected at their outer ends so as to form in effect an arch, or U-shaped support. The disks 20 are mounted eccentrically upon the pins 19 so as to effect a raising and lowering of the fork or scoop 23 when turning the operating lever 24 into any desired angular position with reference to the head 16. Links 25 loosely connect the fork or scoop 23 with the disks 20 and are preferably provided in pairs which embrace opposite sides of the respective disks 20 so as to equalize the strain thereon. The lower ends of the links 25 are pivotally connected to arms 26 at opposite sides of the fork or scoop 23. The disks 20 are toothed and mesh with idlers 27 mounted upon pins connecting the links of the respective pairs.

As a result of this construction, the links move in unison and admit of the sides of the fork or scoop always moving in parallel planes perpendicular to the ground. It will be understood that turning of the disks 20 upon their pivot supports 19 will effect a raising or a lowering of the fork or scoop by reason of the eccentric mounting of said disks. The fork or scoop is held in the adjusted position by means of a spring actuated latch bolt 28 entering one of a series of notches formed in the counterbalance of the head 16. The pivot supports 19 are in transverse alinement with the center of the head 16, thereby admitting of the inner end of the operating lever 24 maintaining a given position with reference to said head and insuring engagement of the latch bolt 28 with the selected notch therein.

Plates 29 are secured to opposite sides of the head 16 and project beyond the circumference thereof and are formed in their inner faces with grooves 30 to receive ribs 31 projected outward from the inner end of the operating lever 24 so as to hold the same positively to the head 16. In the operation of the lever 24 its inner end travels around the circumference of the head 16 and the ribs 31 move in the grooves 30, thereby holding the parts in fixed relation. This is shown most clearly in Fig. 9. A series of clips 32 are attached to the operating lever 24 at intervals in its length, and constitute stops as well as keepers to hold the wire 33 or like connection in place. A head 34 is slidably mounted upon the operating lever 24 and is provided with forked arms 35 terminating in lateral extensions 36 which form stops. The head 34 has connection with the latch bolt 28 by means of the wire or analogous means 33. A latch lever 37 is pivoted at 38 to the operating lever and is formed with opposite lugs 39 which are channeled to receive the fork arms 35. Upon turning of the latch lever 37 upon its pivot connection 38 with the operating lever, one or the other of the lugs 39 will engage with a stop 36 and effect an outward movement of the head 34 and withdraw the latch bolt 28 from engagement with the head 16, thereby permitting free movement of the operating lever to effect desired adjustment of the fork or scoop. A slide 40 mounted upon the latch lever 37 is adapted to engage either the outer end of the operating lever 24 or a branch 41 thereof so as to hold the latch lever and the operating lever in the desired position. A grip 42 projects laterally from the operating lever 24 and forms a hand piece to facilitate the operation of the lever 24 when adjusting the fork.

The fork or scoop 23 is provided with a bail 43 which is adapted to be adjustably connected with the operating lever 24 to admit of varying the elevation of said fork or scoop from the ground when the operating lever occupies an approximately horizontal position, as indicated in Fig. 1. To admit of adjustably connecting the bail 43 with the operating lever 24, a clamp 44 is provided, said clamp being of U-form in side view and having its members notched in their ends to receive the operating lever 24. The members of the clamp are spaced apart a distance corresponding to the width of the clips or stops 32 so as to prevent relative play of the clamp upon the operating lever when fitted thereto. One of the members of the clamp 44 is made longer than the other and is provided with a spring actuated catch 45 to engage over the upper edge of the operating lever to hold the clamp in place thereon. The bail 43 is received in the space formed between the members of the clamp 44 and is held in position by means of a set screw 46 threaded into a corner of the clamp, as shown most clearly in Fig. 6. When the operating lever 24 occupies a horizontal position, as shown in Fig. 1, the fork or scoop occupies a similar position and its elevation from the ground may be regulated by moving the clamp 44 along the operating lever and engaging it with a selected clip or stop 32, the spring actuated catch 45 admitting of the adjustment being readily effected. Upon turning the operating lever into any angular position, the fork or scoop may be correspondingly adjusted, as indicated most clearly in Fig. 3. The operating lever and fork are held in the desired position by engagement of the latch bolt 28 with one of a series of notches formed in the head 16. The running board 14 and platform 13 provide a safe support for the operator, and these parts have cleats upon their upper side to prevent slipping. The running board is attached to U shaped supports 47 secured to the pole or tongue 4 and its rear end is loose and projects in the rear of the pivot joint 50 formed in the pole or tongue, thereby admitting of the weight of the driver being utilized to support the front end of the tongue and relieve the animals when the machine is in operation. A hand fork or rake 48 is conveniently at hand and supported in fork standards 49 extended upward from the running board and platform.

Having thus described the invention, what is claimed as new is:

1. In combination, a frame provided with ground supporting means and with a fork or like load carrier, a draft frame having the rear ends of its side members widened vertically and engaging vertical portions of the arched frame to obtain extended bearings upon said main frame, and loose connections between the main and draft frames to prevent turning of said parts and admit of their having a relative limited vertical movement.

2. In combination, an arch having its side members vertically arranged and provided with ground supporting means, a fork or load carrier supported by means of said arch, a draft frame having the rear ends of its side members widened vertically and engaging vertical portions of the arched frame to obtain extended bearings upon the vertical members of the aforesaid arch and having the rear edges indented, and slidable connections between the draft frame and arch and normally occupying a position in the indentations formed in the rear edges of the draft frame side bars, substantially as set forth.

3. In combination, a main frame provided with ground supporting means and with a fork or load carrier and having an approximately horizontally arranged draft frame, a pole connected to said draft frame and having a hinged joint, and a platform and running board extending over the joint formed in the pole and connected to the latter, the platform resting upon the draft frame, substantially as and for the purpose set forth.

4. In combination, an arch, means fitted to the side members of the arch for supporting the same from the ground, a fork, connecting means between the fork and said members of the arch comprising swinging links 25 having pivotal connection at one end with the fork and rotary means 20 having the opposite end of the links 25 pivoted thereto a distance from their supporting pivots; means for securing the said rotary means in an adjusted position, and other means for securing the fork swung either forward or rearward of a given position.

5. In combination, a main frame, a fork, a pivotally mounted U-shaped support 22, means for moving and holding the U-shaped support in an adjusted position, connecting links 25 between the fork and the side members of the said U-shaped support, means for moving the fork independently of or with the said U-shaped support, and means for securing the fork in the adjusted position.

6. In combination, an approximately vertical arch provided with ground supports, an arm pendent from the horizontal portion of the arch and terminating in a head of approximately circular form, a fork or load carrier loosely supported in line with the center of the aforesaid head, an operating lever for adjusting the fork, and a latch bolt carried by said operating lever and adapted to engage with the aforementioned head to hold the fork in adjusted position.

7. In combination, a main frame, an operating lever pivoted upon the main frame, means for securing the operating lever in an adjusted position, a fork, a link connection between the fork and main frame to admit of the fork having both a swinging and a pivotal movement, a clamp adjustable upon the said operating lever, and connecting means between the clamp and the aforesaid fork.

8. In combination, a frame comprising an arch 1 provided with ground wheels, a draft frame having a limited vertical play with reference to said arch and connected thereto, a fork, a link connection between said fork and the aforesaid arch, an operating lever, means for securing said operating lever in an adjusted position, and means for adjustably connecting the fork with said operating lever to admit of varying the elevation of said fork, said fork having movement with the operating lever to admit of moving it to any angular position.

9. In combination, an arch provided with ground wheels, a draft frame connecting with the side members of the arch and having a limited vertical play, an arm 15 projected from the arch and terminating in an approximately circular head 16, an operating lever pivoted to the said arch in line with the axis of the ground wheels and the center of the circular head 16, means for securing the operating lever in an adjusted position and cooperating with said head 16, a fork, a link connection between said fork and arch, and means adjustably connecting the fork with the said operating lever to admit of varying the elevation of the fork and at the same time to permit of its turning with the operating lever.

10. In combination, a main frame, an arm extended therefrom and provided with a head of approximately circular form, a load carrier, connecting means between the load carrier and main frame, an operating lever for effecting adjustment of the load carrier and having ribs projected from opposite sides at its inner end, and plates embracing opposite sides of the said head and projected beyond the circumference thereof and having grooves upon their inner faces to receive the ribs at the sides of said operating lever.

11. In combination, an arch provided with ground supports, an arm pendent from the horizontal portion of the arch and terminating in a head of approximately circular form, braces between said arm and the side members of the arch, hangers pendent from the upper, outer ends of said braces, an arch having its side members pivotally supported between the side members of the main arch and the hangers, an operating lever connected with the movable arch and provided with a latch bolt for coöperation with a head at the lower end of the aforementioned arm, a load carrier, and connections between said load carrier and the movable arch, the parts being arranged for operation, substantially as specified.

In testimony whereof we affix our signatures in presence of two witnesses.

ALEXANDER KORMIL. [L. S.]
FREDRICK RADLOFF. [L. S.]

Witnesses:
N. B. BROOKS,
F. A. SMITH.